United States Patent
Singh (10) Patent No.: US 8,930,478 B2
(45) Date of Patent: *Jan. 6, 2015

(54) METHOD AND SYSTEM FOR ORGANIZING ELECTRONIC MESSAGES USING EYE-GAZE TECHNOLOGY

(71) Applicant: Scenera Technologies, LLC, Portsmouth, NH (US)

(72) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/852,323

(22) Filed: Mar. 28, 2013

(65) Prior Publication Data
US 2013/0219003 A1 Aug. 22, 2013

Related U.S. Application Data (63) Continuation of application No. 13/412,086, filed on Mar. 5, 2012, now Pat. No. 8,412,787, which is a continuation of application No. 11/164,145, filed on Nov. 11, 2005, now Pat. No. 8,156,186.

(51) Int. Cl.
  *G06F 15/16* (2006.01)
  *G06Q 10/10* (2012.01)
  *H04L 12/58* (2006.01)

(52) U.S. Cl.
  CPC .............. *H04L 51/04* (2013.01); *G06Q 10/107* (2013.01)
  USPC ........................................... 709/206; 709/207

(58) Field of Classification Search
  None
  See application file for complete search history.

(56) References Cited

U.S. PATENT DOCUMENTS

| | | | |
|---|---|---|---|
| 4,595,990 A | 6/1986 | Garwin et al. | |
| 5,649,061 A | 7/1997 | Smyth | |
| 6,204,828 B1 | 3/2001 | Amir | |
| 6,212,548 B1 | 4/2001 | DeSimone et al. | |
| 6,577,329 B1 | 6/2003 | Flickner et al. | |
| 6,603,491 B2 | 8/2003 | Lemelson et al. | |
| 6,903,723 B1 | 6/2005 | Forest | |
| 7,013,258 B1 * | 3/2006 | Su et al. ........................... | 704/1 |

(Continued)

OTHER PUBLICATIONS

Saint-Andre, P., "JEP-0119: Extended Presence Protocol Suite," [online] Jabber Software Foundation, Mar. 28, 2005 [retrieved on Aug. 4, 2005]; Retrieved from the Internet: <URL:http//www.jabber.org/jeps/jep-0124.html>, 8 pages.

(Continued)

*Primary Examiner* — Thanh Tammy Nguyen
*Assistant Examiner* — Keyvan Emdadi (57) ABSTRACT

Organizing messages received and transmitted over a network is described. In one aspect, a method includes tracking where a user is gazing as the user is composing an outgoing message on a first computer system. During a composition time period in which the user is composing the message, a relevance rating for one or more of a plurality of gaze areas is determined. The relevance rating of a gaze area is based on a number of times the user's gaze dwells on the displayed message associated with the gaze area after the user's gaze is directed away from the displayed message. The method further includes identifying at least one displayed message that is related to the outgoing message based on at least one of the relevance ratings, and associating an identifier for at least one of the at least one related message with the outgoing message.

35 Claims, 9 Drawing Sheets

(56) References Cited

U.S. PATENT DOCUMENTS

| | | | |
|---|---|---|---|
| 7,444,383 B2 | 10/2008 | Horvitz | |
| 2002/0010745 A1* | 1/2002 | Schneider | 709/206 |
| 2002/0103625 A1 | 8/2002 | Card et al. | |
| 2003/0030670 A1 | 2/2003 | Duarte et al. | |
| 2003/0163536 A1 | 8/2003 | Pettine | |
| 2003/0212746 A1* | 11/2003 | Fitzpatrick et al. | 709/206 |
| 2004/0073616 A1 | 4/2004 | Fellenstein et al. | |
| 2004/0078435 A1 | 4/2004 | Dunbar et al. | |
| 2005/0055412 A1 | 3/2005 | Kaminsky et al. | |
| 2005/0114781 A1 | 5/2005 | Brownholtz et al. | |
| 2005/0131744 A1 | 6/2005 | Brown et al. | |
| 2005/0149621 A1 | 7/2005 | Kirkland et al. | |
| 2006/0193494 A1 | 8/2006 | Toyama | |
| 2008/0024392 A1 | 1/2008 | Gustafsson et al. | |

OTHER PUBLICATIONS

Sugano, H., et al., "Presence Information Data Format (PIDF)," [online] The Internet Society, May 2003 [retrieved on Aug. 4, 2005]; Retrieved from the Internet: <URL:http://www.ietf.org/proceedings/04aug/I-D/draft-ietf-impp-cpim-pidf-08.txt>, 23 pages.

Day, M., et al., RFC 2778, "A Model for Presence and Instant Messaging" [online] The Internet Society, Feb. 2000 [retrieved on May 6, 2005]; Retrieved from the Internet: <URL:http://www.ietf.org/rfc/rfc2778.txt?number=2778>, 14 pages.

Day, M., et al., RFC 2779, "Instant Messaging / Presence Protocol Requirements" [online] The Internet Society, Feb. 2000 [retrieved on May 6, 2005];Retrieved from the Internet: <URL:http://www.ietf.org/rfc/rfc2779.txt>, 22 pages.

\* cited by examiner

METHOD AND SYSTEM FOR ORGANIZING ELECTRONIC MESSAGES USING EYE-GAZE TECHNOLOGY

RELATED APPLICATIONS

This application is a continuation of U.S. Pat. No. 8,412,787 titled "Method And System For Organizing Electronic Messages Using Eye-Gaze Technology," filed Mar. 5, 2012, which is a continuation of U.S. patent application Ser. No. 11/164,145, issued as U.S. Pat. No. 8,156,186, titled, "Method And System For Organizing Electronic Messages Using Eye-Gaze Technology," filed Nov. 11, 2005, which are commonly owned with this application, the entire disclosures of which are hereby incorporated by reference in their entirety.

TECHNICAL FIELD

The present invention relates to computer systems and more particularly to a method and system for organizing electronic messages received and transmitted between at least two computer systems over a network.

BACKGROUND

Electronic messaging systems that allow individuals to communicate with one another over a network using stationary or mobile electronic devices are ubiquitous. Arguably, the most commonly used electronic messaging technique is a messaging technique known as electronic mail or email. Most, if not all, electronic devices include an email client that allows the device to receive and send email messages to other email clients on other electronic devices. Generally, an email message sent from one device is received by an email server in the network and stored in a "mailbox" for the receiving party. The receiving party must retrieve the email message from the mailbox.

Another type of electronic messaging technique that has recently gained wide spread use is commonly known as instant messaging (IM). An IM client in the electronic device allows the device to send and receive electronic messages near instantaneously via an IM service provider in the network. The IM service provider routes messages directly from the sender to the recipient, so long as the recipient is able to receive the message, i.e., the recipient is online. Such IM service providers include AOL, MSN, Yahoo, and other similar service providers. Hence, with IM, users can exchange messages in close to real-time, and such communications more closely resemble a typical conversation.

Typically, the IM client organizes and displays each message in the chronological order in which it was received or sent. For example, if a first user is chatting with a second user, a message sent by the first user is displayed in a message window and when the second user replies, the response is displayed beneath the message sent by the first user. The first user's reply to the second user's response, when sent, is displayed beneath the second user's response. Hence, the presumption is that each successive message is in response to the preceding message. Chronological organization is not a problem so long as each user is willing to wait politely for the other user to compose and send his or her response before doing the same.

That, however, is not usually the case. More typically, during a chat session, the communication between users is a rapid-fire exchange of short messages, e.g., much like a conversation. Users typically do not wait politely for a reply to their messages before sending another message. The next message might be an extension of thoughts in the previous message or completely unrelated. Hence, while one user is composing a reply to a first message, several additional messages can be received and displayed in the message window. When the user sends the reply, the reply is displayed beneath the last message received, which is not necessarily the message to which the reply is related. Thus, when the user reviews the messages displayed in the message window, confusion can arise as to which message the reply is related.

Figure 1A:
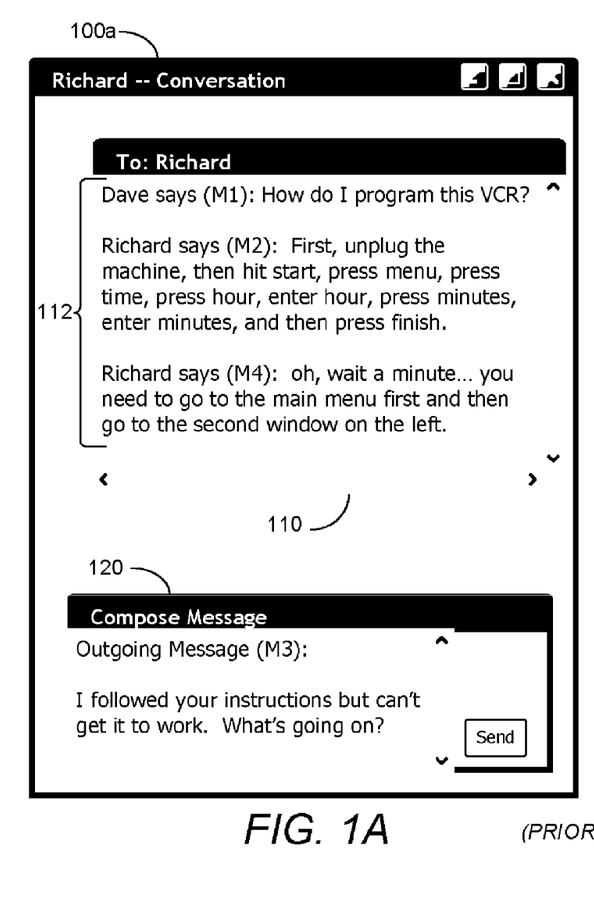
FIG. 1A and FIG. 1B are exemplary user interfaces provided by an instant messaging client in an electronic device.

For example, consider FIG. 1A, which is an exemplary user interface provided by an IM client in an electronic device. The conversation window 100a indicates that Dave is chatting with Richard. The message window 110 displays previously transmitted and received messages 112 that reflect an ongoing communication between Dave and Richard in which Dave has sent a message (M1) to Richard asking Richard how to program a VCR. Richard's response (M2) provides step by step instructions. Dave tries to follow Richard's instructions but is unable to program the VCR. Dave composes an outgoing message (M3) in the composition window 120 telling Richard of his failure. In the meanwhile, Richard has discovered that he has given Dave the wrong instructions and sends a follow up message (M4) that includes the correct instructions. Dave does not read Richard's follow up message (M4) and sends the outgoing message (M3) back to Richard.

Figure 1B:
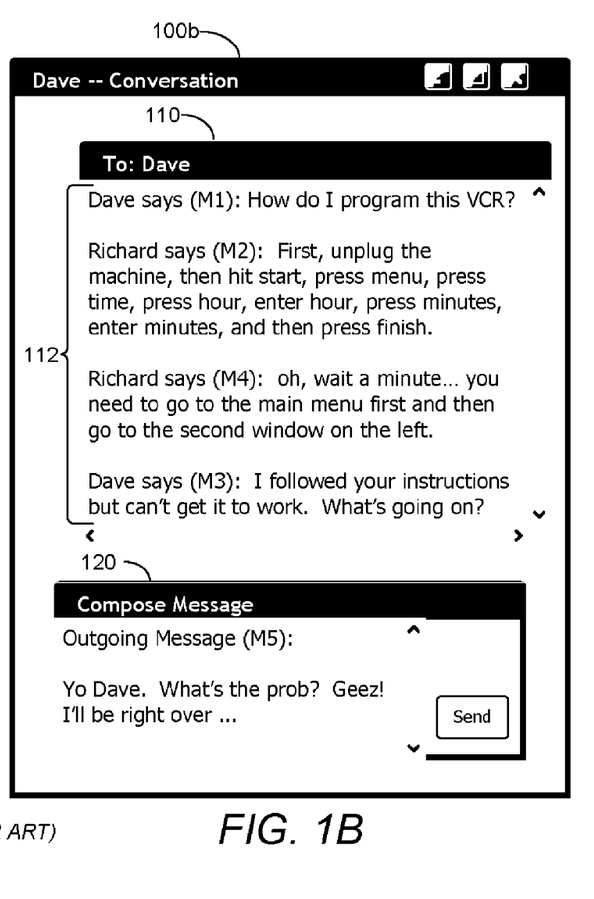

FIG. 1B is an exemplary user interface 100b provided by an IM client on Richard's device. Dave's reply (M3) is received and the message window 110 displays the reply (M3) beneath the Richard's follow up message (M4). Because Dave's reply (M3) does not indicate that it is related to Richard's erroneous instructions (M2), Richard assumes that the reply (M3) is related to the follow up message (M4) including the correct instructions. Richard then composes an acerbic reply (M5) because he thinks Dave is incompetent, logs off, and prepares to pay a visit to Dave.

Clearly, as illustrated in the example above, chronological organization of the displayed messages 112 can cause confusion during an exchange, which can be a serious problem for customer relations management (CRM). In that environment, a CRM team must be able to determine which messages are relevant to a customer's response. If the CRM team's reply is off the mark, the customer will be frustrated with the CRM team's lack of responsiveness and can terminate the relationship. In addition, chronological organization of the displayed messages 112 can cause confusion if the messages are reviewed at a later time, e.g., by an administrator or investigator who was not a party to the original communication.

SUMMARY

A method for organizing messages received and transmitted between at least two computer systems over a network and a system configured to implement the method are described. In one aspect, the method includes tracking where a user is gazing as the user is composing an outgoing message on a first computer system. During a composition time period in which the user is composing the outgoing message, a relevance rating for one or more of a plurality of gaze areas is determined. Each gaze area is associated with one of a plurality of messages displayed by the first computer system, and the relevance rating of a gaze area is based on a number of times the user's gaze dwells on the displayed message associated with the gaze area after the user's gaze is directed away from the displayed message. The method further includes identifying at least one displayed message that is related to the outgoing message based on at least one of the relevance rating for the one or more of the plurality of gaze areas, and associating an identifier for each related message with the outgoing message.

BRIEF DESCRIPTION OF THE DRAWINGS

The various features of the present invention and the manner of attaining them will be described in greater detail with reference to the following description, claims and drawings, wherein reference numerals are reused, where appropriate, to indicate a correspondence between the referenced items, and wherein:

DETAILED DESCRIPTION

The present invention relates to computer systems and more particularly to a method and system for organizing electronic messages received and transmitted between at least two computer systems over a network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 2:
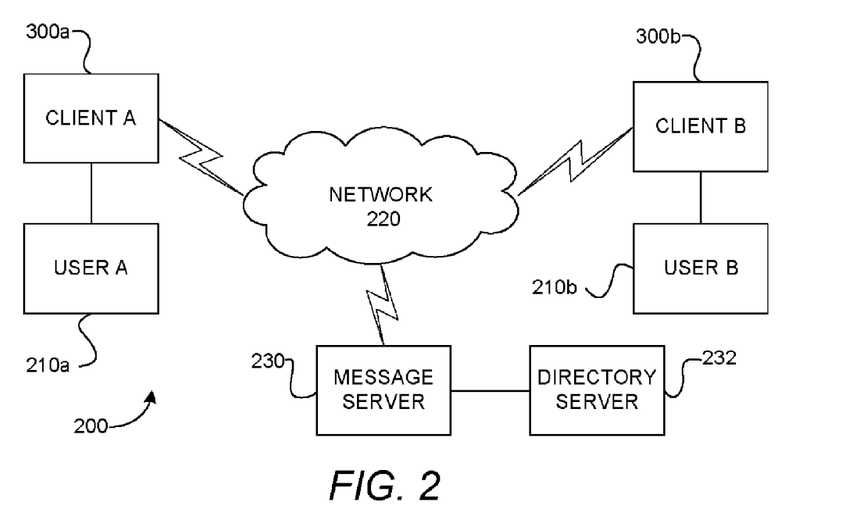
FIG. 2 is a block diagram of an exemplary instant messaging environment according to an exemplary embodiment.

FIG. 2 is a block diagram of an exemplary IM environment according to one embodiment. The IM environment 200 includes at least two electronic devices or client devices 300a, 300b, that are configured to allow users 210a, 210b to communicate with one another over a network 220. In one embodiment, the client devices 300a, 300b can be any network enabled device, such as a laptop computer, a personal digital assistant (PDA), a mobile phone, and the like. The network 220 can be a private network, or a public network, such as the Internet. Each client device 300a, 300b preferably includes a messaging client, such as an IM client (not shown), that enables the device 300a, 300b to send and receive messages, e.g., instant messages, via the network 220.

The IM environment 200 also includes a message server 230 that supports electronic messaging between the users 210a, 210b via client devices 300a, 300b. In one embodiment, the message server 230 can be a typical email server. In another embodiment, the message server 230 can be an IM server 230 that supports instant messaging between users 210a, 210b (assuming both users 210a, 210b are available, e.g., online). In that embodiment, the IM server 230 collects and stores data, known as presence information, associated with users 210a, 210b and uses the presence information in a known manner to authenticate and authorize users 210a, 210b and client devices 300a, 300b so that communication between client devices 300a, 300b via the IM server 230 are secure. If the client device 300a, 300b is behind a firewall, the IM server 230 facilitates access through the firewall.

More information on IM and presence information can be found at the jabber.org/jeps site. For example document jep-0119.html is of interest. In addition, the ietf.org site contains internet related documents related to presence information and IM. Such documents include draft-ietf-impp-cpim-pidf-08.txt in the internet-drafts section of the ietf.org site, as well as rfc2778.txt and rfc2779.txt in the rfc section of the ietf.org site.

Figure 3:
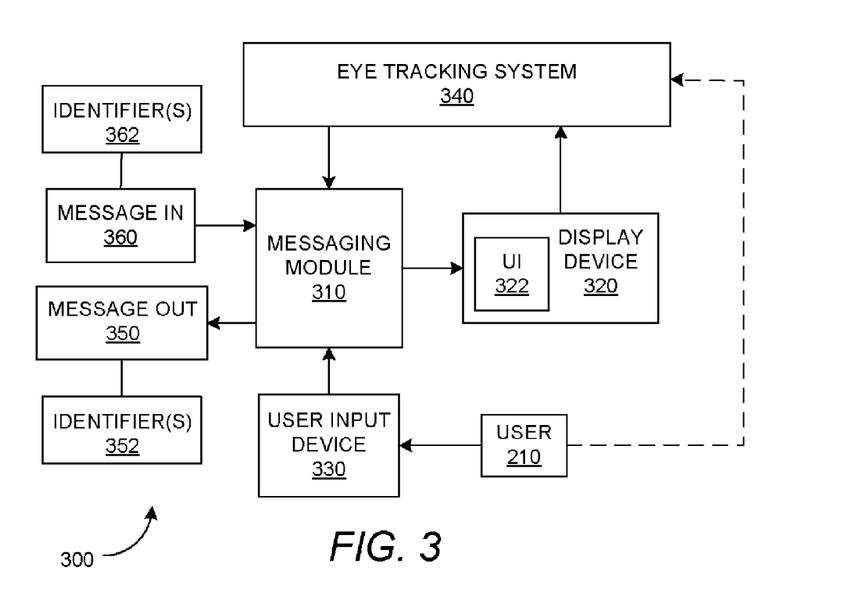
FIG. 3 is a block system diagram of a client device according to an exemplary embodiment.

FIG. 3 is a system block diagram of a client device 300 according to one embodiment. The client device 300 includes means 310 for transmitting and receiving messages 350, 360 to and from other client devices 300 via the network 220. For example, such means 310 can include a messaging module. In one embodiment where the messages 350, 360 are instant messages, the messaging module 310 can be a modified IM client.

The client device 300 also includes a means for displaying 320 a user interface 322 provided by the transmitting and receiving means 310, a means for allowing the user 210 to enter data 330, and a means for tracking where the user is gazing 340. In one embodiment, the displaying means 320 can be a standard display device, such as an LCD screen or the like. The displayed user interface 322, illustrated in more detail in FIG. 4, includes a conversation window 400 which comprises a plurality of messages 402 that have been previously received and transmitted. In addition, the user interface 322 includes a composition window 410 in which a prospective outgoing message 412 is displayed during a message composition time period.

Referring again to FIG. 3, the means for entering data 330 can be a keypad, keyboard, touchpad, or other suitable user input device known in the art. The data entry means 330 allows the user 210 to compose the outgoing message 350 and to enter commands, e.g., "send," that can be interpreted and executed by the messaging module 310.

In one embodiment, the user gaze tracking means 340 can be an eye-tracking system 340 that tracks where the user 210 is gazing as the user 210 is composing the prospective outgoing message 412 and conveys eye-tracking data to the messaging module 310. The eye-tracking system 340 can use many different known techniques to monitor and track the user's eye movements. For example, the eye-tracking system 340 can utilize a technique known as corneal reflection, which directs an infrared light beam at the user's eye and measures the angular difference between the operator's mobile pupil and the stationary light beam reflection. Alternatively, the eye-tracking system 340 can scan the user's eye region with a scanning apparatus, e.g., television camera, and analyze the resulting image. Eye-tracking systems 340 that can be appropriate for use with the client devices 300 described here include those systems currently implemented in digital cameras, such as the EOS ELAN 7/7e and the EOS 55, both manufactured by Canon Inc., of Tokyo, Japan, or those systems currently implemented in laptop computers, such as the QUICK GLANCE product developed by EyeTech Digital Systems of Mesa, Ariz.

Figure 4:
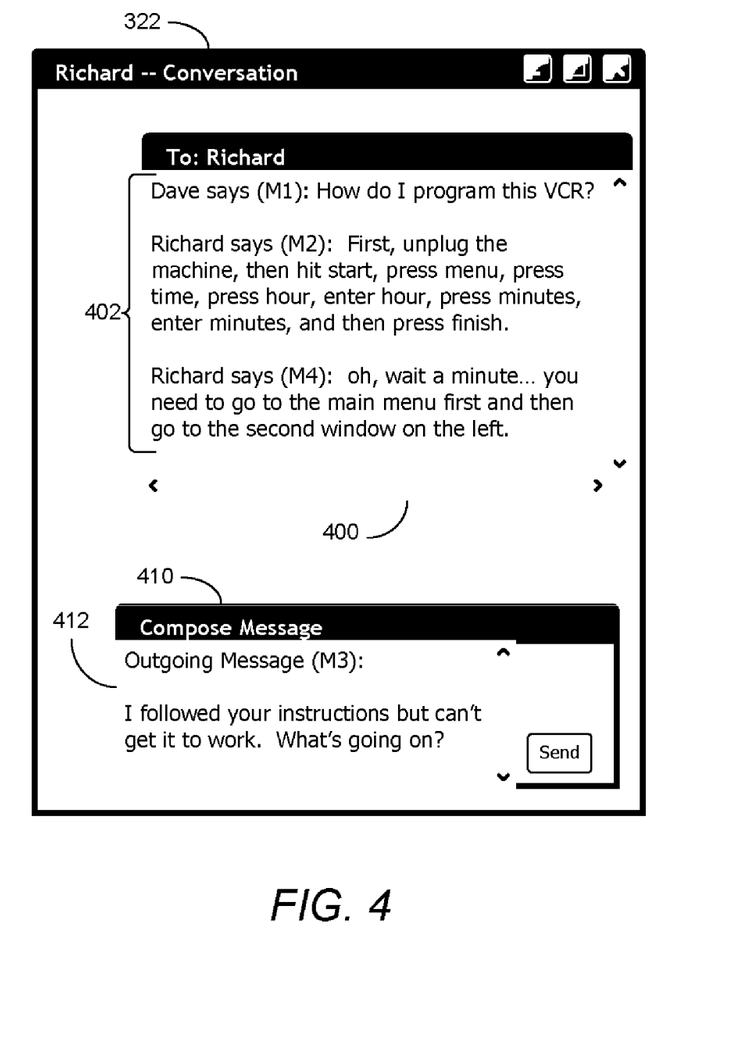
FIG. 4 is an exemplary user interface provided by the messaging module in an electronic device according to one embodiment.

According to one embodiment, the message transmitting and receiving means 310, i.e., the messaging module, automatically determines which of the previously received and transmitted messages 402 are likely related to the prospective outgoing message 412 based on the user's 210 natural behavior, i.e., eye movements, during the composition time period. In particular, the messaging module 310 analyzes the user's 210 gaze pattern as the user 210 is composing the prospective outgoing message 412 to determine relationships between the prospective outgoing message 412 and the previously received and transmitted messages 402. For example, if the gaze pattern indicates that the user's 210 gaze dwelled on a particular message 402 for a long time, or that the user's 210 gaze returned to the particular message 402 several times, the messaging module 310 can reason that the prospective outgoing message 412 has a likelihood of being related to the particular message 402.

Information reflecting the relationship between the final outgoing message 350 and one or more previously transmitted and received messages 402 can be associated with the final outgoing message 350. In one embodiment, an identifier 352 for each related message 402 can be appended as metadata to the outgoing message 350. When the outgoing message 350 is received by the target user 210 as an incoming message 360, the messaging module 310 presents the relationship information such that the target user 210 can easily determine to which of the previously received and transmitted messages 402 the incoming message 360 is related. In this manner, the previously transmitted and received messages 402 can be organized in a natural and logical sequence that minimizes confusion and reflects the natural flow of the conversation.

Figure 5:
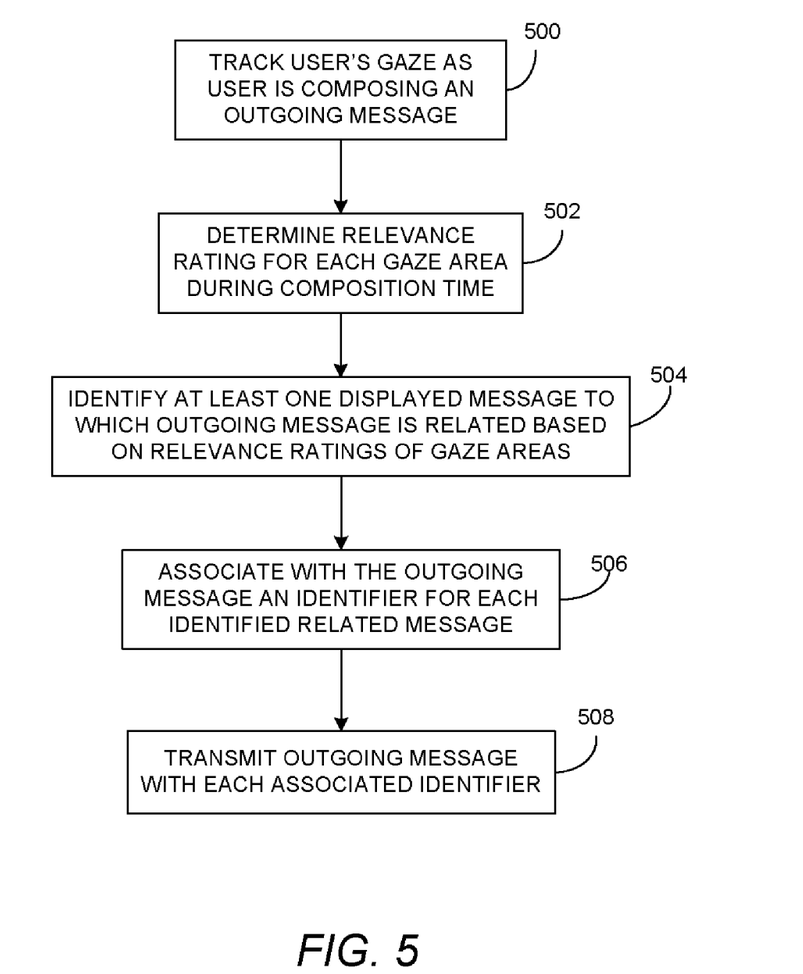
FIG. 5 is a flowchart illustrating a process for organizing a message according to one embodiment.

FIG. 5 is a flowchart illustrating a process for organizing messages according to an embodiment. Referring to FIG. 3, FIG. 4 and FIG. 5, the process begins by tracking where the user 210 is gazing as the user 210 is composing the prospective outgoing message 412 (block 500). During the composition time period, the user 210 presumably reads or focuses on one or more displayed messages 402 to which the prospective outgoing message 412 is related. The eye-tracking system 340 monitors the eye movement of the user 210 and identifies one or more gaze areas on which the user's gaze dwells for a time period exceeding a threshold time period. Each gaze area coincides with and is associated with one of the previously transmitted and received messages displayed 402.

According to a preferred embodiment, the messaging module 310 determines a relevance rating for each gaze area (block 502) during the composition time period. The relevance rating for a gaze area indicates a level of relevance or importance the message 402 associated with the gaze area has to the final outgoing message 350. The relevance rating for a gaze area can be based on a number of factors. In one embodiment, the relevance rating is based on a number of times the user's gaze dwells on the displayed message 402 that is associated with the gaze area after the user's gaze is directed away from the displayed message 402.

Figure 6:
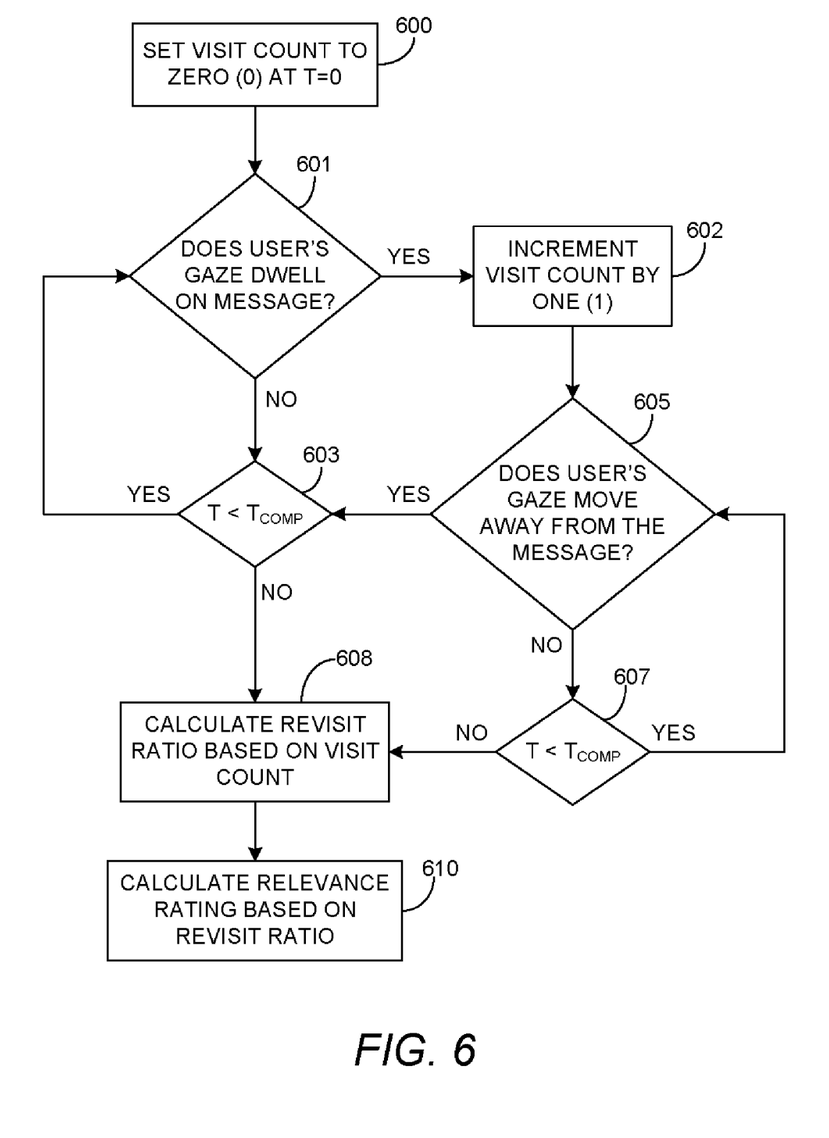
FIG. 6 is a flowchart illustrating a process for determining a relevance rating for a gaze area according to an exemplary embodiment.

FIG. 6 is a flowchart illustrating a process for determining the relevance rating of a gaze area based on number of times the user's gaze dwells on the displayed message 402 associated with the gaze area after the user's gaze is directed away from the displayed message according to one embodiment. At the beginning of the message composition process, e.g., time (T)=zero (0), a visit count for the gaze area is set to zero (0) (block 600). If the eye-tracking system 340 determines that the user's gaze is dwelling on the displayed message 402 associated with the gaze area (block 601), the visit count is incremented by one (1) (block 602). If the eye-tracking system 340 then determines that the user's gaze moves away from the message (block 605) and if the user 210 is still composing the prospective outgoing message 412 (block 603), i.e., T is less than the composition time period, $T_{comp}$, then the eye-tracking system 340 continues to monitor the user's eye movements. Each time thereafter the user's gaze returns to dwell on the displayed message 402 (block 601), the visit counter increments by one (1) (block 602).

When the user 210 has finished the prospective outgoing message 412, i.e., $T > T_{comp}$, (block 603, 607), the messaging module 310 calculates a revisit ratio of the gaze area based on the visit count (block 608). In particular, the revisit ratio comprises the number of visits to the gaze area, i.e., the visit count, divided by a total number of visits to all gaze areas. The relevance rating of the gaze area is then calculated based on the relevance ratio (block 610).

Figure 7:
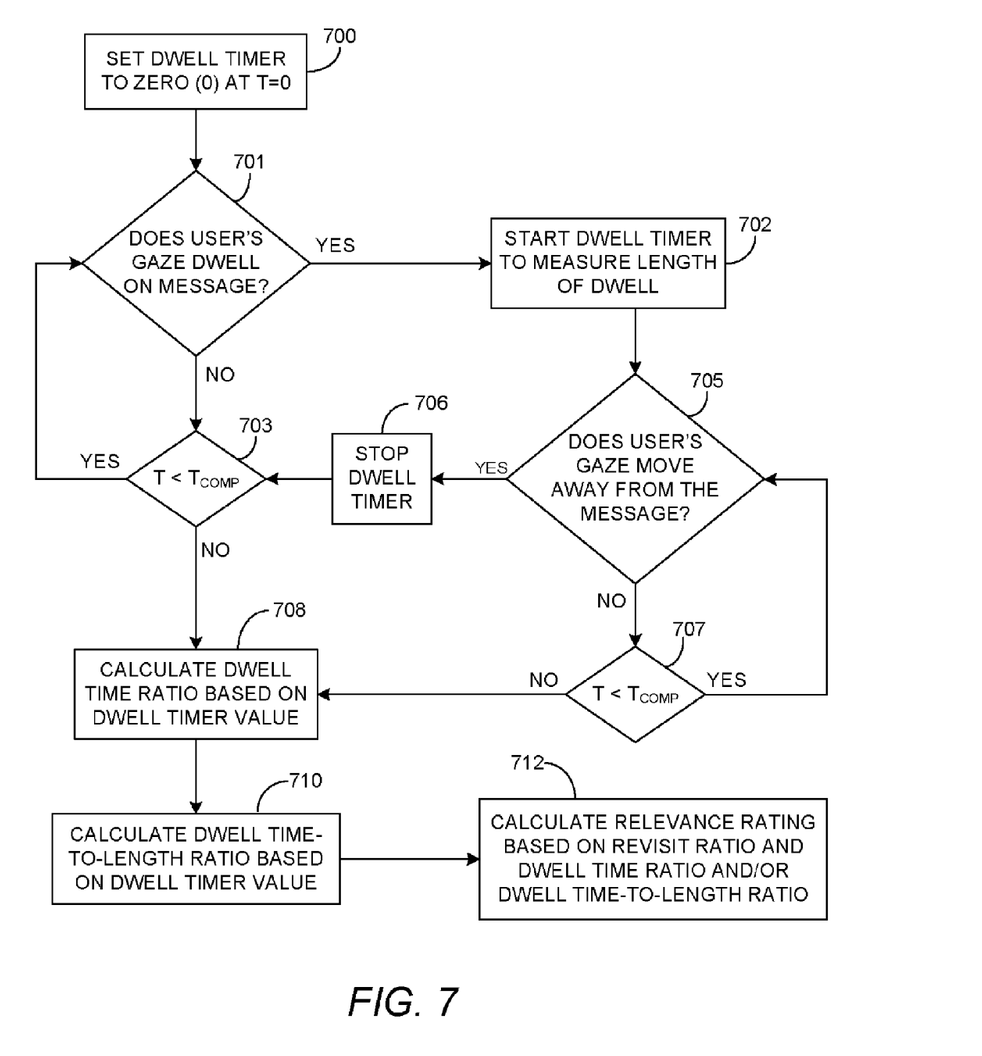
FIG. 7 is a flowchart illustrating a process for determining a relevance rating for a gaze area according to another exemplary embodiment.

In another embodiment, the relevance rating of a gaze area can be based on the revisit ratio and a dwell time and/or dwell time-to-message length associated with the gaze area. FIG. 7 is a flowchart illustrating a process for determining the relevance rating based on the dwell time and/or dwell time-to-message length associated with the gaze area according to one embodiment. At the beginning of the message composition process, e.g., time (T)=zero (0), a dwell timer of the gaze area is set to zero (0) (block 700). If the eye-tracking system 340 determines that the user's gaze is dwelling on the displayed message 402 associated with the gaze area (block 701), the dwell timer starts and begins measuring the length of time, $T_{dwell}$, the user's gaze dwells on the message 402 (block 702). If the eye-tracking system 340 then determines that the user's gaze moves away from the message 402 (block 705), the dwell timer is stopped (block 706). If the user 210 is still composing the prospective outgoing message 412 (block 703), i.e., $T < T_{comp}$, then the eye-tracking system 340 continues to monitor the user's eye movements. Each time thereafter the user's gaze returns to dwell on the displayed message 402 (block 701), the dwell timer starts again and continues measuring the dwell time (block 702).

When the user 210 has finished the prospective outgoing message 412, i.e., $T > T_{comp}$, (block 703, 707), the messaging module 310 calculates a dwell time ratio of the gaze area based on the aggregated dwell time (block 708). In particular, the dwell time ratio comprises the aggregated dwell time, i.e., the total length of time the user's gaze dwelled on the message 402 associated with the gaze area, divided by the composition time period. The messaging module 310 also calculates a dwell time-to-length ratio based on the aggregated dwell time (block 710). In particular, the dwell time-to-length ratio comprises the aggregated dwell time divided by the number of characters in the message 402 associated with the gaze area. The relevance rating of the gaze area is then calculated based on the relevance ratio and the dwell time ratio and/or the dwell time-to-length ratio (block 712). In one embodiment, the relevance rating is a weighted sum of the relevance ratio and the dwell time ratio and/or the dwell time-to-length ratio.

Figure 8:
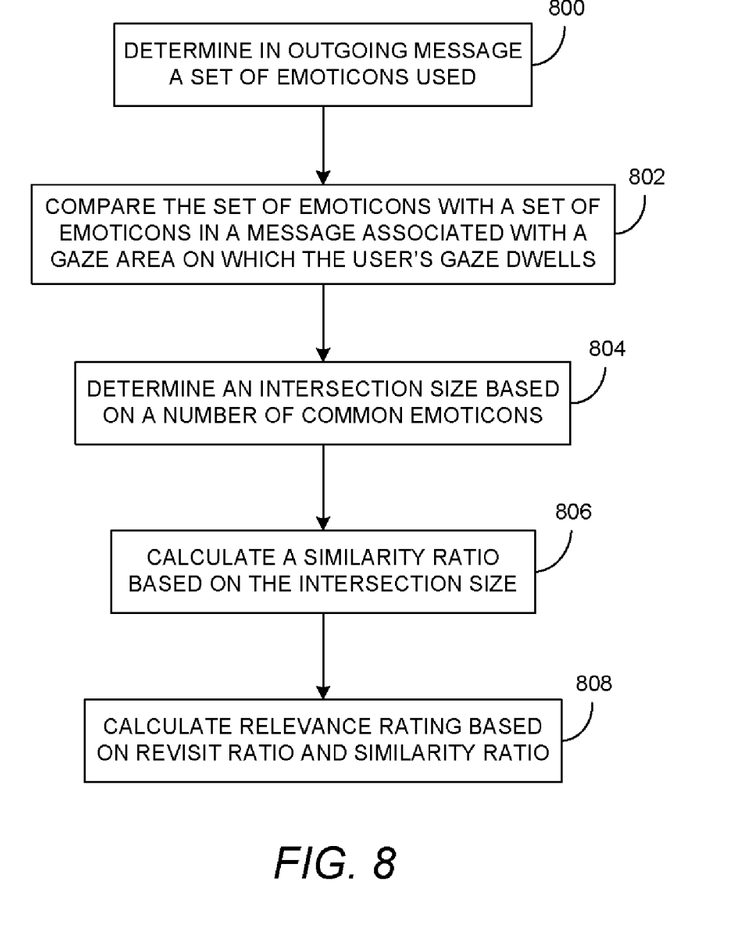
FIG. 8 is a flowchart illustrating a process for determining a relevance rating for a gaze area according to another exemplary embodiment.

In another embodiment, the relevance rating of a gaze area can be based on a set of graphic facial expressions, referred to as emoticons, present in the message 402 associated with the gaze area. FIG. 8 is a flowchart illustrating a process for determining the relevance rating based on emoticons according to one embodiment. The process begins by determining a set of emoticons used in the final outgoing message 350 (block 800). Emoticons are widely used graphic icons that express various emotions. For example, a smiling face, e.g., ☺, is an emoticon that expresses happiness. Several different emoticons are available and can be used as shorthand for exclamations and emotional expressions.

Once the set of emoticons in the final outgoing message 350 has been determined, the messaging module 310 compares the set of emoticons in the outgoing message 350 with a set of emoticons in the message 402 associated with the gaze area (block 802). The messaging module 310 then determines an intersection size based on the number of common emoticons in the outgoing message 350 and in the message 402 associated with the gaze area (block 804), and calculates a similarity ratio based on the intersection size (block 806). In particular, the similarity ratio comprises the intersection size divided by the intersection sizes of all gaze areas. The relevance rating of the gaze area is then calculated based on the relevance ratio and the similarity ratio (block 808). In one embodiment, the relevance rating is a weighted sum of the relevance ratio and the similarity ratio.

Figure 9:
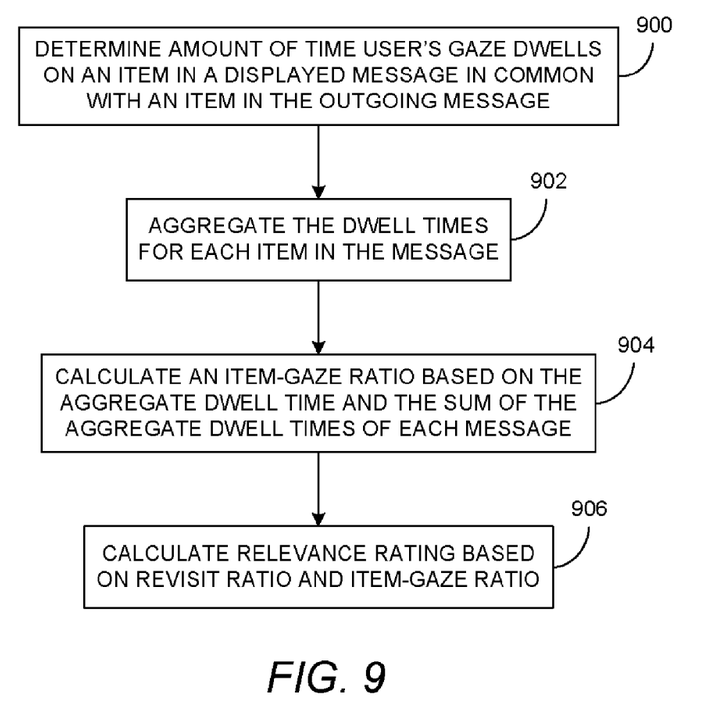
FIG. 9 is a flowchart illustrating a process for determining a relevance rating for a gaze area according to another exemplary embodiment.

In another embodiment, illustrated in FIG. 9, the relevance rating for a gaze area can be determined based on an amount of time the user's gaze dwells on an item, e.g., a word, an emoticon, or a phrase, in a message 402 associated with the gaze area, where the item is a common item also found in the final outgoing message 350. In this embodiment, the messaging module 310 determines the amount of time the user's gaze dwells on each common item in the message 402 (block 900) and aggregates the dwell time for each common item in the message (block 902). The messaging module 310 then calculates an item-gaze ratio for the gaze area based on the aggregated dwell time for the items in the message 402 (block 904). In particular, the item-gaze ratio comprises the aggregated dwell time for the gaze area divided by a sum of all aggregated dwell times for all gaze areas. The relevance rating of the gaze area is then calculated based on the relevance ratio and the item-gaze ratio (block 906). In one embodiment, the relevance rating is a weighted sum of the relevance ratio and the item-gaze ratio.

In another embodiment, the item-gaze ratio can be calculated utilizing natural language processing theory. In this embodiment, each item in a message 402 is assigned a term weight, $TW_i$, based on the ratio of the amount of time the user's gaze dwells on the item, $t_i$, divided by the total amount of time the user's gaze dwells on the message 402, $t_m$. That is, $TW_i = (t_i/t_m)$. In addition, each item in the message is assigned a collection weight (CW) defined as:

$$CW_i = \log_2(N/n_i)$$

where N is the total number of messages considered and $n_i$ is the number of messages 402 in which the item "i" occurs. The messaging module 310 then calculates an item weight, $IW_i$, for each item in each message. The item weight is defined as:

$$IW_i = (CW_i)(TW_i)$$
$$= \log_2(N/n_i) \times (t_i/t_m).$$

For each message 402 considered, a vector is specified whose dimensions are the items occurring in a message and whose elements are the item weights for each item in the message. The messaging module 310 then weights each message based on the inner product of the message's vector and a vector for the outgoing message. The inner product of two vectors is the sum of each vector's element-wise product. That is, the inner product of two vectors, V1 and V2, each having two elements is the sum of the product of the first elements of V1 and V2, and the product of the second elements of V1 and V2. In this embodiment, the number of elements is the number of items under consideration.

In each embodiment described above, the relevance rating of a gaze area is based on the revisit ratio and the weighted sum of the revisit ratio and either the dwell time ratio, the dwell time-to-length ratio, the similarity ratio, the item-gaze ratio, or combinations thereof. In one embodiment, each ratio can be equally weighted. In another embodiment, one of more of the ratios can be more heavily weighted depending on the nature of the messages or other circumstances.

Referring again to FIG. 4 and FIG. 5, once the relevance ratings for the gaze areas have been determined (block 502), the messaging module 310 identifies at least one of the previously transmitted and received messages 402 to which the final outgoing message 350 is related based on the relevance ratings of the gaze areas (block 504). In one embodiment, each displayed message 402 is associated with an identifier 352. The messaging module 310 associates the identifier 352 corresponding to each of the related messages 402 with the final outgoing message 350 (block 506).

In one embodiment, the identifiers 352 can be associated as metadata of the final outgoing message 350. Each identifier 352 can be paired with its relevance rating and both the identifiers 352 and the respective relevance ratings can be associated with the final outgoing message 350 as metadata. For example, the metadata associated with the final outgoing message 350 can comprise an identifier for the user 210 and a ranked list of message identifiers, with or without their respective relevance ratings, for messages 402 related to the final outgoing message 350. The identifiers 352 can be included in a dedicated header field for the final outgoing message 350. Once the identifiers 352, and optionally other relevance information, are associated with the final outgoing message 350, the messaging module 310 transmits the final outgoing message 350 to the intended target user (block 508).

Figure 10:
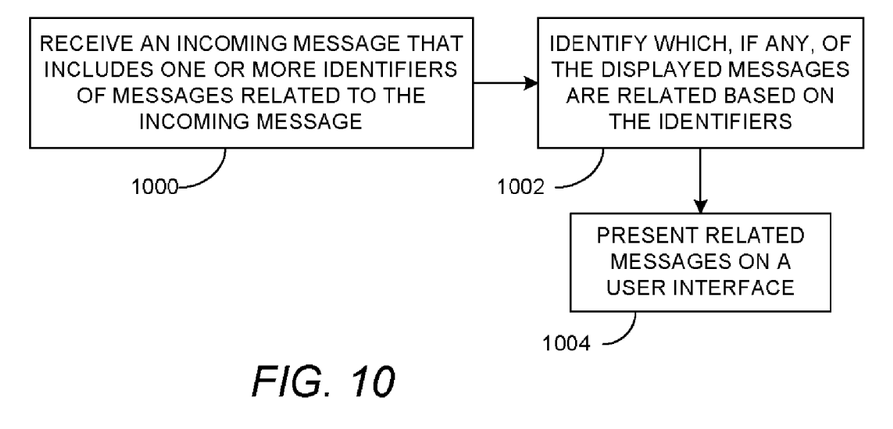
FIG. 10 is a flowchart illustrating a process for organizing an incoming message according to an exemplary embodiment.

When the client device 300 receives an incoming message 360 that includes identifiers 362 from another client device (FIG. 3), the messaging module 310 is configured to organize the incoming message 360 based on the identifiers 362. FIG. 10 is a flowchart illustrating a process for organizing an incoming message according to one embodiment. The process begins when the messaging module 310 receives the incoming message 360 that includes one or more identifiers 362 associated with messages 402 related to the incoming message 360 (block 1000). The messaging module 310 then identifies which, if any, of the previously transmitted and received messages displayed 402 are related to the incoming message 360 based on the identifiers 362 (block 1002).

The identified related messages are then presented on the user interface 322 (block 1004) such that the user 210 is able to determine easily which of the displayed messages 402 is related to the incoming message 360. In one embodiment when the identifiers 362 are paired with their respective relevance ratings, the relevance rating for each related message is also presented on the user interface 322 to indicate to the user 210 which of the related messages is most and least relevant.

Figure 11A:
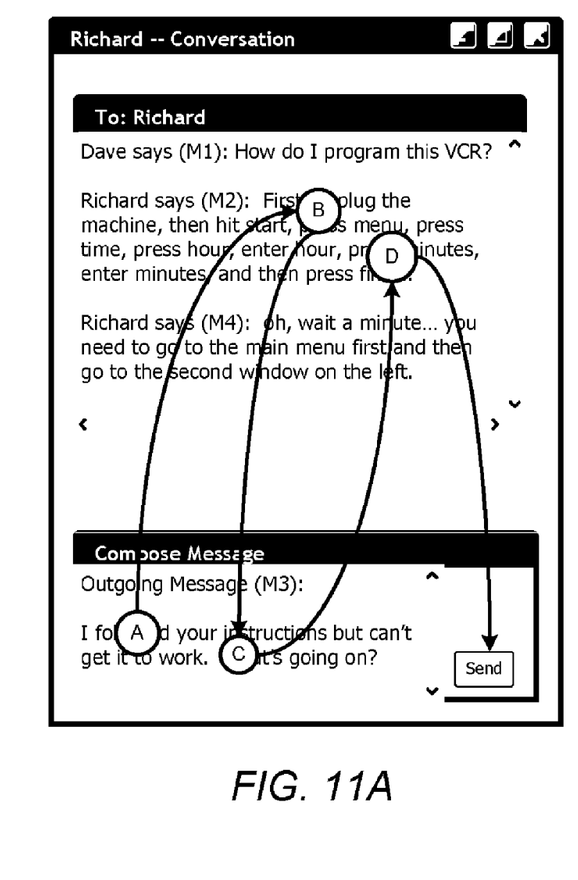
FIG. 11A and FIG. 11B are exemplary user interfaces provided by the messaging module in an electronic device according to one embodiment.
Figure 11B:
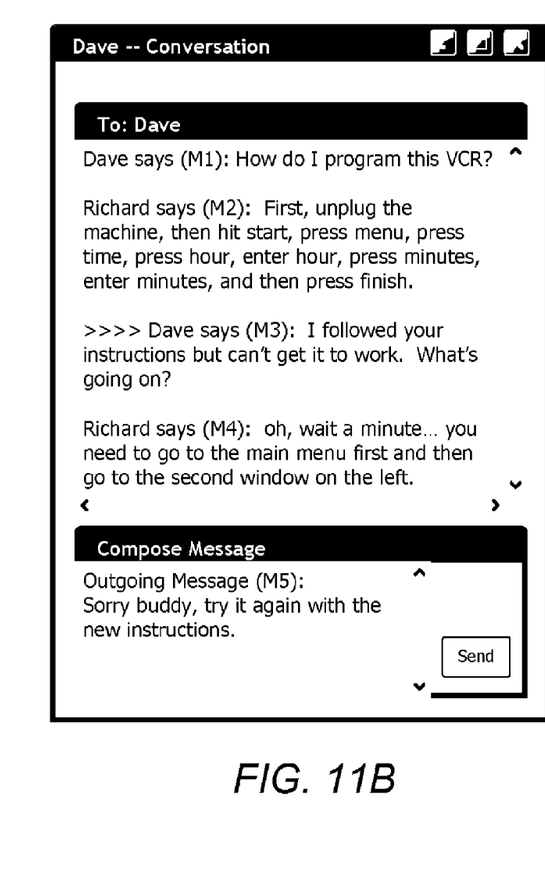

FIG. 11A and FIG. 11B provide an example of the operation of the present invention according to one embodiment. FIG. 11A illustrates an exemplary user interface 322 provided by the messaging module 310 during message composition. As is shown, the user 210 composing the prospective outgoing message 412 (Dave) gazes at a gaze area designated as "A" when the user 210 begins composing the outgoing message 412. During the composition time period, the eye-tracking system 340 records Dave's eye movement from gaze area "A" to gaze area "B" to gaze area "C" to gaze area "D" and then to the "send" button. Based on this gaze pattern, the messaging module 310 determines that displayed message two (M2) is related to the final outgoing message 350 and therefore the identifier 352 for message two (M2) is associated with the final outgoing message 350.

FIG. 11B illustrates an exemplary user interface 322 on the display device 320 of the target client device 300 that receives Dave's outgoing message 350 as an incoming message 360. Here, the messaging module 310 uses the identifier 362 to determine that message two (M2) of the displayed messages 402 is related to the incoming message 360 from Dave, and then inserts the incoming message 360 directly beneath the related message (M2). At this point, Richard realizes that Dave has not yet read his most recent message (M4), and instead of sending an acerbic response, merely reminds Dave to try the new instructions contained in message four (M4).

The techniques described above monitor and record a user's natural eye movements as the user is composing an outgoing message, and utilize this information to infer which messages are related to the outgoing message. In one embodiment, the number of times the user's gaze returns to a particular message during a composition time period is recorded and used to infer the particular message's relevance. In another embodiment, the amount of time the user gazes at a particular message or at a particular item in a message is used to infer relevance. In another embodiment, the number of common emoticons in both messages is used to infer relevance. When the outgoing message is ready to be sent, identifiers of the related messages are associated with the outgoing message. The receiving client device uses the identifiers to organize automatically the incoming message in relation to its related messages so that the receiving entity can easily determine to which messages the incoming message is related.

By organizing messages in this manner, as opposed to chronologically, the sequence of messages is more accurate and the electronic conversation is easier to follow. Thus, the parties to the communication can communicate more clearly and compose more relevant replies, and if the messages are reviewed at a later time by a nonparty to the communication, the reviewer can follow the conversation more easily.

The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made by one of ordinary skill in the art without departing from the spirit and scope of the appended claims.

I claim:

1. A method for organizing messages received and transmitted between at least two computer systems over a network, the method comprising:
   tracking where a user of a first computer system is gazing as the user is composing an outgoing message;
   determining during a composition time period in which the user is composing the outgoing message a relevance rating for one or more of a plurality of gaze areas, wherein each gaze area is associated with one of a plurality of displayed messages displayed by the first computer system, and wherein the relevance rating of a gaze area is based on a number of times the user's gaze dwells on the displayed message associated with the gaze area after the user's gaze is directed away from the displayed message;
   identifying, based on at least one of the relevance ratings for the one or more of the plurality of gaze areas, at least one displayed message that is related to the outgoing message; and
   associating with the outgoing message an identifier for at least one of the at least one displayed message that is related to the outgoing message,
   wherein at least one of the preceding actions is performed on at least one electronic hardware component.

2. The method according to claim 1 wherein determining the relevance rating of a gaze area includes:
   counting a number of times the user visits the gaze area by directing the user's gaze to the gaze area; and
   calculating a revisit ratio of the gaze area, the revisit ratio comprising the number of visits to the gaze area divided by a total number of visits to all gaze areas.

3. The method according to claim 2 wherein the relevance rating for a gaze area is further based on a dwell time associated with the gaze area, and wherein determining the relevance rating for the gaze area further includes:
   calculating a dwell time ratio of the gaze area, the dwell time ratio comprising an aggregate of an amount of time the user's gaze dwells on the gaze area divided by the composition time period; and
   calculating a weighted sum of the revisit ratio and the dwell time ratio.

4. The method of claim 2 wherein the relevance rating for a gaze area is further based on a dwell time associated with the gaze area, and wherein determining the relevance rating for the gaze area further includes:
   calculating a dwell time-to-length ratio of the gaze area, the dwell time-to-length ratio comprising an aggregate of an amount of time the user's gaze dwells on the gaze area divided by a total number of characters in the displayed message associated with the gaze area; and
   calculating a weighted sum of the revisit ratio and the dwell time-to-length ratio.

5. The method of claim 2 wherein the relevance rating for a gaze area is further based on a set of emoticons present in the displayed message associated with the gaze area.

6. The method of claim 5 wherein determining the relevance rating for the gaze area further includes:
   determining in the outgoing message a set of emoticons used;
   comparing the set of emoticons in the outgoing message with the set of emoticons in the message associated with the gaze area;
   based on the comparison, determining an intersection size of the message associated with the gaze area, wherein the intersection size is based on a number of common emoticons in the outgoing message and in the message associated with the gaze area;
   calculating a similarity ratio of the gaze area, the similarity ratio comprising the intersection size of the gaze area divided by an aggregate of intersection sizes of all gaze areas; and
   calculating a weighted sum of the revisit ratio and the similarity ratio.

7. The method of claim 2 wherein the relevance rating for a gaze area is further based on an amount of time the user's gaze dwells on at least one item included in the displayed message associated with the gaze area and included in the outgoing message, wherein the at least one item comprises either a word, an emoticon, or a phrase.

8. The method of claim 7 wherein determining the relevance rating for the gaze area further includes:
   determining an amount of time the user's gaze dwells on each of the at least one items in the displayed message associated with the gaze area;
   aggregating the amount of time for each of the at least one items;
   calculating an item-gaze ratio of the gaze area, the item-gaze ratio comprising the aggregated item time of the gaze area divided by a sum of aggregated item times of all gaze areas; and
   calculating a weighted sum of the revisit ratio and the item-gaze ratio.

9. The method of claim 1 wherein associating with the outgoing message an identifier for each displayed message related to the outgoing message includes associating information related to the relevance rating of each related displayed message as metadata of the outgoing message.

10. The method of claim 1 further comprising transmitting the outgoing message with each associated identifier to a second computer system.

11. The method of claim 1 further comprising:
   receiving by the first computer system an incoming message from a second computer system, wherein the incoming message includes one or more identifiers of one or more messages;
   identifying which, if any, of the displayed messages are related to the incoming message based on the one or more identifiers; and
   presenting the identified related messages on a user interface of the first computer system.

12. The method of claim 11 wherein each of the one or more identifiers included in the incoming message is paired with a relevance rating and wherein presenting the identified related messages further includes presenting the respective relevance rating of each identified related message on the user interface of the first computer system.

13. A system comprising:
   a messaging module stored in memory and operably executed by a processor, the messaging module for transmitting and receiving messages to and from other computer systems of a network;
   a display device coupled to the messaging module for displaying a plurality of messages that have been previously received and transmitted and for displaying an outgoing message;
   a user input device coupled to the messaging module for allowing the user to compose the outgoing message; and
   an eye-tracking system coupled to the messaging module and to the display device for tracking where the user is gazing as the user composes the outgoing message,
   wherein the messaging module determines, during a composition time period in which the user is composing the outgoing message, a relevance rating for one or more of a plurality of gaze areas, wherein each gaze area is associated with one of the plurality of displayed messages, and wherein the relevance rating of a gaze area is based on a number of times the user's gaze dwells on the displayed message associated with the gaze area after the user's gaze is directed away from the displayed message, identifies, based on at least one of the relevance ratings of the one or more of the plurality of gaze areas, at least one displayed message that is related to the outgoing message, and associates with the outgoing message an identifier for at least one of the at least one displayed message.

14. The system of claim 13 wherein the messaging module is configured to count a number of times the user visits the gaze area by directing the user's gaze to the gaze area and calculate a revisit ratio of the gaze area, the revisit ratio comprising the number of visits to the gaze area divided by a total number of visits to all gaze areas.

15. The system of claim 14 wherein the relevance rating for a gaze area is further based on a dwell time associated with the gaze area, and wherein the messaging module is further configured to calculate a dwell time ratio of the gaze area, the dwell time ratio comprising an aggregate of an amount of time the user's gaze dwells on the gaze area divided by the composition time period and to calculate a weighted sum of the revisit ratio and the dwell time ratio.

16. The system of claim 14 wherein the relevance rating for a gaze area is further based on a dwell time associated with the gaze area, and wherein the messaging module is further configured to calculate a dwell time-to-length ratio of the gaze area, the dwell time-to-length ratio comprising an aggregate of an amount of time the user's gaze dwells on the gaze area divided by a total number of characters in the displayed message associated with the gaze area and to calculate a weighted sum of the revisit ratio and the dwell time-to-length ratio.

17. The system of claim 14 wherein the relevance rating for a gaze area is further based on a set of emoticons present in the displayed message associated with the gaze area.

18. The system of claim 17 wherein the messaging module is further configured to determine in the outgoing message a set of emoticons used, to compare the set of emoticons in the outgoing message with the set of emoticons in the message associated with the gaze area, to determine, based on the comparison, an intersection size of the message associated with the gaze area, wherein the intersection size is based on a number of common emoticons in the outgoing message and in the message associated with the gaze area, to calculate a similarity ratio of the gaze area, the similarity ratio comprising the intersection size of the gaze area divided by an aggregate of intersection sizes of all gaze areas, and to calculate a weighted sum of the revisit ratio and the similarity ratio.

19. The system of claim 14 wherein the relevance rating for a gaze area is further based on an amount of time the user's gaze dwells on at least one item included in the displayed message associated with the gaze area and included in the outgoing message, wherein the at least one item comprises either a word, an emoticon, or a phrase.

20. The system of claim 19 wherein the messaging module is further configured to determine an amount of time the user's gaze dwells on each of the at least one items in the displayed message associated with the gaze area, to aggregate the amount of time for each of the at least one items, to calculate an item-gaze ratio of the gaze area, the item-gaze ratio comprising the aggregated item time of the gaze area divided by a sum of aggregated item times of all gaze areas, and to calculate a weighted sum of the revisit ratio and the item-gaze ratio.

21. The system of claim 13 wherein the messaging module is configured to associate the identifier and information related to the relevance rating of each identified related displayed message as metadata of the outgoing message.

22. The system of claim 13 wherein the messaging module is configured to transmit the outgoing message with each associated identifier to a second computer system.

23. The system of claim 13 wherein the messaging module is configured to receive an incoming message from a second computer system, wherein the incoming message includes one or more identifiers of one or more messages, to identify which, if any, of the displayed messages are related to the incoming message based on the one or more identifiers, and to present the identified related messages on the display device of the first computer system.

24. The system of claim 23 wherein each of the one or more identifiers included in the incoming message is paired with a relevance rating and wherein the messaging module is configured to present the respective relevancy rating of each identified related message along with the identified related messages on the display device.

25. A non-transitory computer readable medium containing a computer program for organizing messages received and transmitted between at least two computer systems over a network, the computer program comprising executable instructions for:
   tracking where a user of a first computer system is gazing as the user is composing an outgoing message;
   determining during a composition time period in which the user is composing the outgoing message a relevance rating for one or more of a plurality of gaze areas, wherein each gaze area is associated with one of a plurality of messages displayed by the first computer system, and wherein the relevance rating of a gaze area is based on a number of times the user's gaze dwells on the displayed message associated with the gaze area after the user's gaze is directed away from the displayed message;
   identifying, based on at least one of the relevance ratings for the one or more of the plurality of gaze areas, at least one displayed message that is related to the outgoing message; and associating with the outgoing message an identifier for at least one of the at least one displayed message that is related to the outgoing message.

26. The computer readable medium according to claim 25 wherein the executable instructions for determining the relevance rating of a gaze area includes executable instructions for counting a number of times the user visits the gaze area by directing the user's gaze to the gaze area, and calculating a revisit ratio of the gaze area, the revisit ratio comprising the number of visits to the gaze area divided by a total number of visits to all gaze areas.

27. The computer readable medium according to claim 26 wherein the relevance rating for a gaze area is further based on a dwell time associated with the gaze area, and wherein the executable instructions for determining the relevance rating for the gaze area further include instructions for:
   calculating a dwell time ratio of the gaze area, the dwell time ratio comprising an aggregate of an amount of time the user's gaze dwells on the gaze area divided by the composition time period; and
   calculating a weighted sum of the revisit ratio and the dwell time ratio.

28. The computer readable medium of claim 26 wherein the relevance rating for a gaze area is further based on a dwell time associated with the gaze area, and wherein the executable instructions for determining the relevance rating for the gaze area further include instructions for:
   calculating a dwell time-to-length ratio of the gaze area, the dwell time-to-length ratio comprising an aggregate of an amount of time the user's gaze dwells on the gaze area divided by a total number of characters in the displayed message associated with the gaze area; and
   calculating a weighted sum of the revisit ratio and the dwell time-to-length ratio.

29. The computer readable medium of claim 26 wherein the relevance rating for a gaze area is further based on a set of emoticons present in the displayed message associated with the gaze area, and wherein the executable instructions for determining the relevance rating for the gaze area further include instructions for:
   determining in the outgoing message a set of emoticons used;
   comparing the set of emoticons in the outgoing message with the set of emoticons in the message associated with the gaze area;
   based on the comparison, determining an intersection size of the message associated with the gaze area, wherein the intersection size is based on a number of common emoticons in the outgoing message and in the message associated with the gaze area;
   calculating a similarity ratio of the gaze area, the similarity ratio comprising the intersection size of the gaze area divided by an aggregate of intersection sizes of all gaze areas; and
   calculating a weighted sum of the revisit ratio and the similarity ratio.

30. The computer readable medium of claim 26 wherein the relevance rating for a gaze area is further based on an amount of time the user's gaze dwells on at least one item included in the displayed message associated with the gaze area and included in the outgoing message, wherein the at least one item comprises either a word, an emoticon, or a phrase, and wherein the executable instructions for determining the relevance rating for the gaze area further include instructions for:
   determining an amount of time the user's gaze dwells on each of the at least one items in the displayed message associated with the gaze area;
   aggregating the amount of time for each of the at least one items;
   calculating an item-gaze ratio of the gaze area, the item-gaze ratio comprising the aggregated item time of the gaze area divided by a sum of aggregated item times of all gaze areas; and
   calculating a weighted sum of the revisit ratio and the item-gaze ratio.

31. The computer readable medium of claim 25 wherein the executable instructions for associating with the outgoing message the identifier for each identified displayed message includes instructions for associating information related to the relevance rating of each identified displayed message as metadata of the outgoing message.

32. The computer readable medium of claim 25 further comprising executable instructions for transmitting the outgoing message with each associated identifier to a second computer system.

33. The computer readable medium of claim 25 further comprising executable instructions for:
   receiving by the first computer system an incoming message from a second computer system, wherein the incoming message includes one or more identifiers of one or more messages;
   identifying which, if any, of the displayed messages are related to the incoming message based on the one or more identifiers; and
   presenting the identified related messages on a user interface of the first computer system.

34. The computer readable medium of claim 33 wherein each of the one or more identifiers included in the incoming message is paired with a relevance rating and wherein the executable instructions for presenting the identified related messages further includes instructions for presenting the respective relevance rating of each identified related message on the user interface of the first computer system.

35. A system comprising:
- means for transmitting and receiving messages to and from other computer systems of a network;
- means for displaying a plurality of messages that have been previously received and transmitted and for displaying an outgoing message;
- means for allowing the user to compose the outgoing message; and
- means for tracking where the user is gazing as the user composes the outgoing message,
- wherein the means for transmitting and receiving messages further determines, during a composition time period in which the user is composing the outgoing message, a relevance rating for one or more of a plurality of gaze areas, wherein each gaze area is associated with one of the plurality of displayed messages, and wherein the relevance rating of a gaze area is based on a number of times the user's gaze dwells on the displayed message associated with the gaze area after the user's gaze is directed away from the displayed message, identifies, based on at least one of the relevance ratings for the one or more of the plurality of gaze areas, at least one displayed message that is related to the outgoing message, and associates with the outgoing message an identifier for at least one of the at least one displayed message that is related to the outgoing message.

* * * * *